Nov. 2, 1965         A. G. SILVESTER         3,215,606
NUCLEAR REACTOR WITH EMERGENCY COOLANT CROSS FLOW
Filed March 29, 1965         4 Sheets-Sheet 4

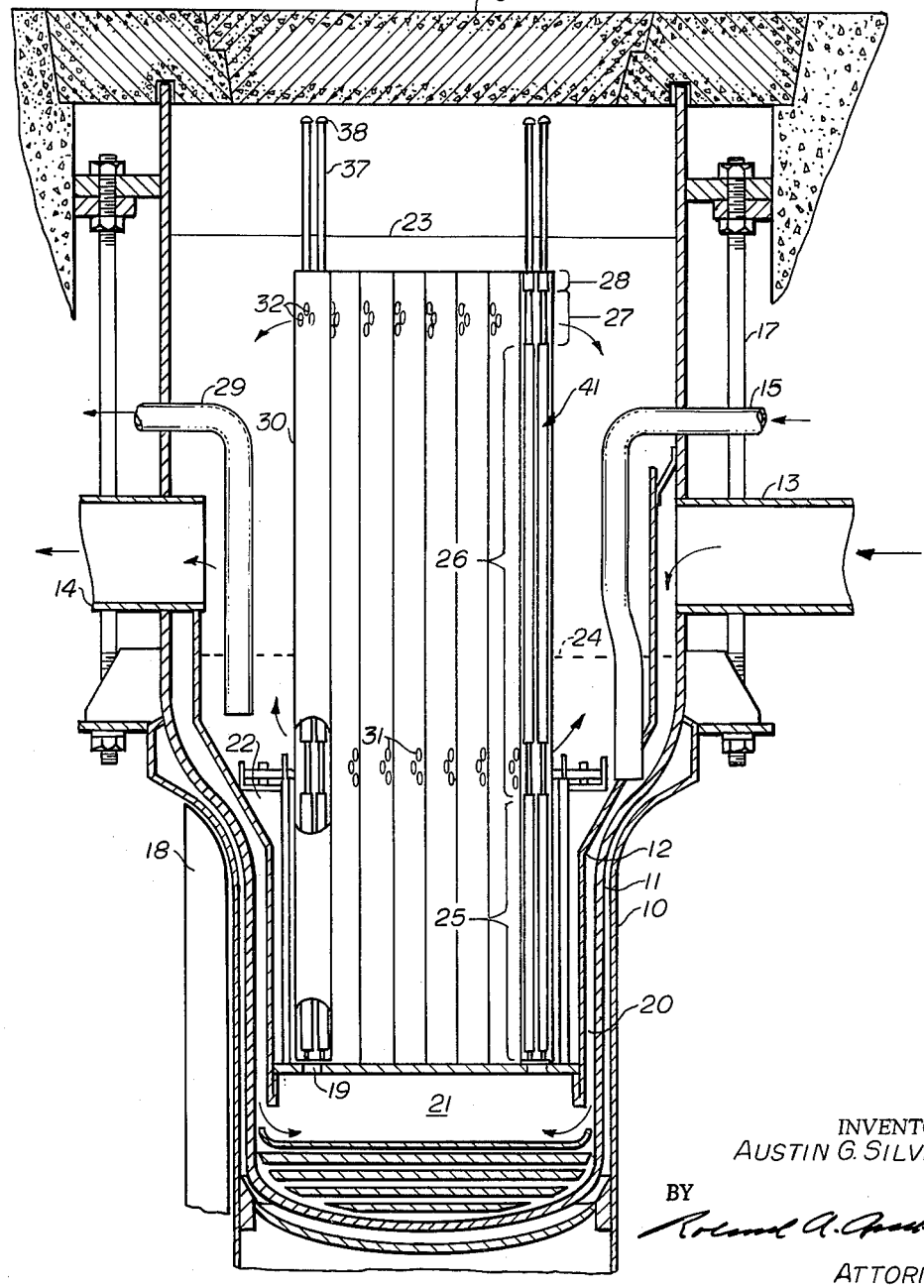

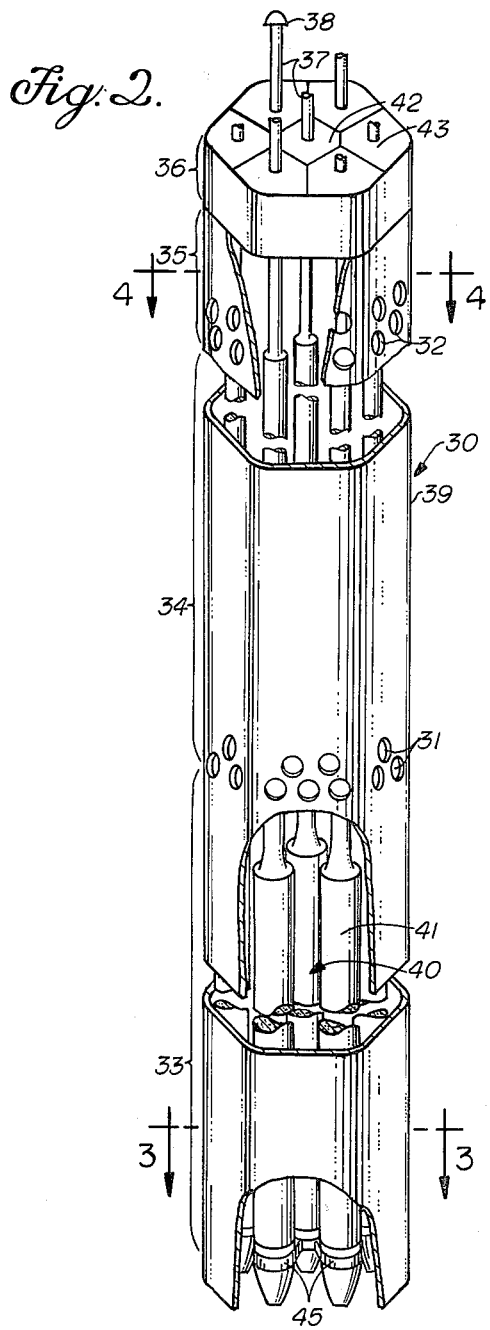

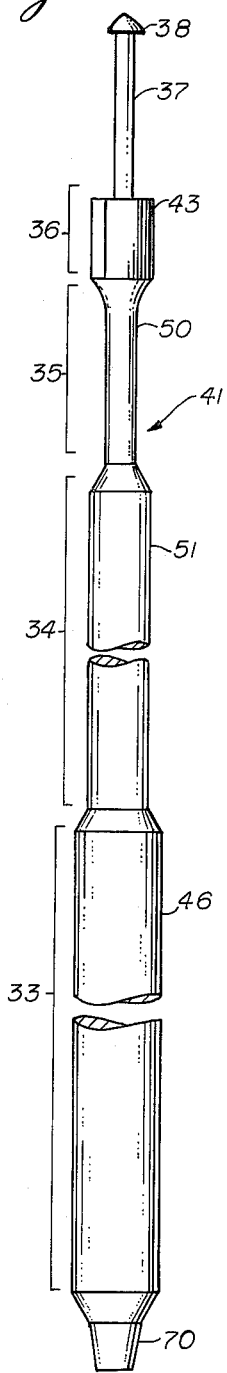
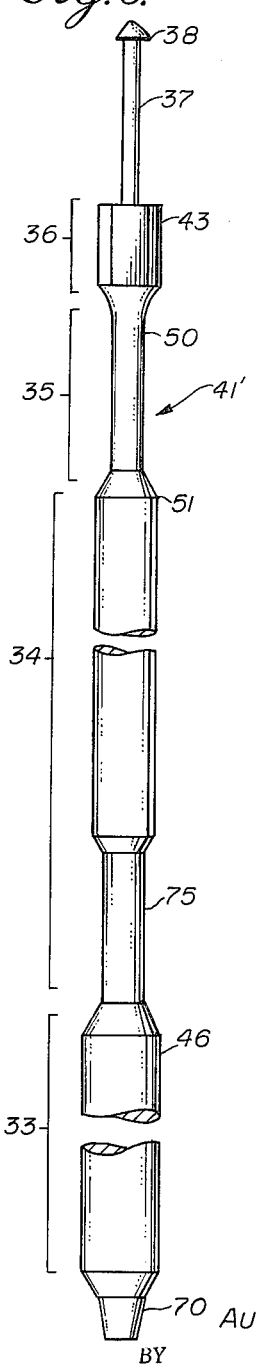

*Fig. 7.*

INVENTOR.
AUSTIN G. SILVESTER
BY
ATTORNEY

United States Patent Office 3,215,606
Patented Nov. 2, 1965

3,215,606
NUCLEAR REACTOR WITH EMERGENCY COOLANT CROSS FLOW
Austin G. Silvester, Los Gatos, Calif., assignor to the United States of America as represented by the United States Atomic Energy Commission
Filed Mar. 29, 1965, Ser. No. 443,726
11 Claims. (Cl. 176—61)

This invention relates to nuclear reactors and in particular to nuclear reactors having a core comprising fuel elements which provide for the reactor coolant to flow across rather than along the rods during an emergency condition such as a sudden increase in reactivity locally within the reactor core resulting in voiding of the coolant.

In nuclear reactors of the prior art, their general configuration employs coolant material flowing parallel or longitudinally along the fuel rods or plates. Should an excursion, i.e., a sudden increase in reactivity occur in a reactor core of that configuration, the coolant will begin to develop voids, i.e., boil and expand, resulting in a quantity of coolant heated to a high temperature to be suddenly expelled from the reactor core. In such a situation the coolant will be accelerated along the channels between fuel rods achieving a high velocity. When impinging on the wall or head of the reactor vessel the high velocity liquid coolant material will produce what is commonly known in the art as "water hammer." Such a condition can produce serious damage and, in the case of a nuclear reactor, tends to rupture or fracture the vessel or its closure covers permitting release of dangerous radioactive materials.

Along with the mechanical forces of the accelerated mass of coolant impinging upon the reactor vessel, there is the added high temperature of the material to cause unequal thermal expansion of the reactor vessel producing a thermal shock which would tend to further weaken or fracture the vessel or its closure plates. In addition, there is during such periods of excessive reactivity, a production of larger amounts of neutrons which tend to flow or "stream" along the fuel channels which are devoid of coolant or contain no moderator material. The reactor vessel head which is usually in line with such channels is thus exposed to an excessive number of neutrons and will thus become highly radioactive.

The device of the present invention reduces these problems by incorporating in the fuel element a means for minimizing expulsion of coolant and preventing the possibility of large directed masses of coolant striking the reactor vessel wall at the same time incorporating means for reducing the thermal shock on the vessel while also preventing exposure of the reactor vessel to excessive neutron exposure by particularly shaping the individual fuel rods and arranging the fuel and moderator portions as hereinafter described.

It is therefore, an object of this invention to provide a fuel element configuration that increases the margin for safe operation of a nuclear reactor during a sudden increase in activity.

It is another object of this invention to provide a fuel element configuration in a nuclear reactor whereby the mechanical forces of the reactor coolant expelled from the core are dissipitated before reaching the reactor vessel containing said core.

It is still another object of this invention to provide a fuel element configuration in a nuclear reactor whereby the heat contained in the reactor coolant expelled from the core is distributed throughout the core structure before reaching the reactor vessel containing said core.

It is yet another object of this invention to provide a fuel element configuration for a nuclear reactor whereby excessive neutron irradiation of the reactor vessel during operation and in particular during a sudden increase in reactivity is substantially reduced.

It is a further object of this invention ot provide a fuel element configuration for a nuclear reactor whereby the coolant is caused to flow in selected regions longitudinally and transversely to the fuel rods to minimize the destructive effects caused by rapid expulsion of coolant therefrom.

It is another object of this invention to provide a fuel element configuration wherein the temperature distribution within the coolant is equalized after emerging from the fuel filled portion of the reactor core.

Other and more particular objects of this invention will be manifest upon study of the following detailed description when taken together with the accompanying drawing in which:

FIGURE 1 is a longitudinal section through the reactor showing fuel elements as installed to form a reactor core;

FIGURE 2 is a partially cutaway view of an individual fuel element showing the fuel rod configuration as assembled in a fuel element of FIG. 1;

FIGURE 3 is a section through the fuel element taken at line 3—3 of FIG. 1 showing fuel rods in fissile fuel portion of a fuel element;

FIGURE 4 is a section through a fuel element taken at line 4—4 of FIG. 1 showing fuel rods in the moderator portion of the fuel element;

FIGURE 5 is a longitudinal view of a typical peripheral fuel and moderatod rod showing the necked down regions providing for cross flow of the coolant;

FIGURE 6 is a longitudinal view of another embodiment of a peripheral fuel and moderator rod showing a variation in the necked down region providing for cross flow of the coolant.

FIGURE 7 is an illustration of a clamping means for the fuel rods within the fuel element.

Basically the device of the present invention is intended for use in a sodium cooled fast neutron reactor as described hereinafter, however its use in other liquid cooled reactors will be readily apparent.

A particular reactor using the fuel element and core of this invention illustrated in FIG. 1 and comprises, basically, an outer support vessel 10 held in place and supported by reactor vessel hanger rods 17, reactor containment vessel 11 within said support vessel 10, inner coolant baffle 12 concentric within said containment vessel 11 with core clamping devices 22 supported by said inner coolant baffle 12 and supporting the core comprising a plurality of individual fuel elements 30, collectively defining a fissile fuel zone 25.

Coolant inlet conduit 13 is provided for introducing liquid sodium into the reactor with coolant outlet 14 provided for conducting said liquid sodium away from the reactor to heat exchangers (not shown) for the production of steam or other uses. A plurality of neutron reflectors 18 are provided exteriorly of vessel 10 to encircle the lower portion of fissile fuel zone 25. which neutron reflectors 18 are arranged to be moved vertically by a conventional control system (not shown) to control neutron leakage and thus reactivity of the reactor. Under normal operating conditions liquid sodium enters the reactor vessel through conduit 13, near the upper end to pass through the entrance plenum 20 between reactor containment vessel wall 11 and inner coolant baffle 12 into bottom plenum 21, then up through the plurality of orifices 19 in the bottom end wall of baffle 12 into the plurality of closely packed fuel elements 30 comprising fuel zone 25. Thenceforth, the coolant flows through fissile fuel zone 25 wherein it is heated, up through moderator and cross flow zone 26, where the heated sodium is intermixed, then into top exit cross flow zone 27, and out upper exit holes 32 into the upper portion of reactor containment vessel 11 to be conducted away from the reactor through conduit 14, which communicates with the interior of baffle 12 to heat exchangers or the like (not shown). Under normal operation the coolant is maintained at normal coolant level 23.

Under emergency conditions, such as when the flow of liquid coolant is blocked in coolant inlet conduit 13 or outlet conduit 14, the coolant is maintained at emergency coolant level 24. Liquid sodium is, in this situation, introduced into entrance plenum 20 through an emergency coolant inlet conduit 15 and out of the reactor to heat exchanging means (not shown) through conduit 29. The flow of coolant will be as described supra with the exception that instead of flowing up through the moderator and cross flow zone 26, it will exit immediately above fissile fuel zone 25 through lower exit holes 31 in the plurality of closely packed fuel elements 30 into the reactor vessel and out through coolant emergency outlet conduit 29 and to a separate heat exchanger (not shown) so that a flow of coolant will, at all times, be maintained through the core to prevent damage from overheating.

A typical individual fuel element 30 is illustrated in FIG. 2. It comprises, basically, a central moderator rod 40 surrounded, in hexagonal array by peripheral fuel and moderator rods 41 with the entire structure enclosed in shroud 39. Although central moderator rod 40 is shown containing moderator material 61, it can be seen that it could also contain fissile fuel. The question of its containing fissile fuel rests with the establishment of the moderator-to-fuel ratio for the purpose of controlling the Doppler coefficient of reactivity of the reactor as described in copending application Serial Number 345,056, filed Feb. 14, 1964.

The fuel element 30 is arranged to include a fissile fuel section 33 corresponding to the portion thereof disposed in fissile fuel zone 25 of FIG. 1 at the lower end of said fuel element, a moderator and cross flow section 34 corresponding to moderator and cross flow zone 26 of FIG. 1 immediately above said fissile fuel section 33 a top exit cross flow section 35 corresponding to top exit cross flow zone 27 FIG. 1 next above said cross flow section 34 and a top shield section 36 corresponding to top shield zone 82 of FIG. 1 proximate the upper end of said fuel element 30. A bottom support spider 45 is provided within and proximate the bottom of shroud 39 for the support of fuel rods and control rod 40 therein while permitting the coolant to flow longitudinally upward through the fuel element.

As an alternate feature to provide intermediate support for peripheral fuel rods 41 a spring clamping means illustrated in FIGURE 7 may be used. The system comprises a bottom spring clamp retaining ring 80 affixed as by welding or the like to center moderator rod 40, a top spring clamp retaining ring 81 arranged to slide up and down center rod 40, a plurality of flexible strip leaf springs 82 equal in number to the peripheral fuel rods 41 having each end retained by clamps 80 and 81 and arranged to flex outwardly when top clamp retaining ring 81 is moved toward bottom clamp retaining ring 80. Clamp actuating tube 83 is provided to bear against top clamp retaining ring 81 and slide along center moderator rod 40. Proximate the top of actuator tube 83 an actuator tube bail 84 having an upper handle 88 and lower handle 89 is provided with a center hole in lower handle 89 to receive retaining stud 85, which is affixed as by welding, drilling and tapping, or the like to the top of center rod 40. Grappler rod extension 37 is affixed as by welding or the like to upper handle 88. Actuator retaining tube nut 86 is provided on stud 85 to regulate the maximum upward movement of actuator tube 83 while actuator tube adjustment nut 87 is provided on stud 85 to regulate the maximum downward movement of tube 83 and thus the outward flexure of springs 82 and resulting pressure against peripheral fuel rod 41.

In operation, center rod 40 is lowered into fuel element 30 after peripheral fuel rods 41 are in place. Retaining nut 86 is loosened to permit springs 82 to lie flat or close to center rod 40. After center rod 40 is in place, the weight of actuator tube 83 will cause columnar compressive forces to applied to springs 82 causing them to flex outwardly and bear against the surface of the adjacent fuel rods 41 thus holding them in place. Adjustment nut 87 may be adjusted to regulate these compressive forces. FIGURE 7 shows the spring clamping system in its simplest form. Relating it to FIGURE 2, and center rod top portion 42, the upper portion of clamp actuator tube 83 would take the shape of a hexagon to form top shield section 36 (FIGURE 2) but still be arranged to slide around center rod 40 as illustrated in FIGURE 7.

With reference to said flow sections, in shroud 39, a plurality of lower exit holes 31 are provided immediately above fissile fuel section 33 and are arranged in ordered array such that corresponding openings in shrouds of adjacent fuel elements will coincide to permit the flow of coolant through said lower exit holes 31 to adjacent fuel elements. Similarly, a plurality of upper exit holes 32 are provided immediately below top shield section 36 and adjacent top exit cross flow section 35 arranged in ordered array such that corresponding openings in shrouds of adjacent fuel elements will coincide to permit the exit of coolant through adjacent fuel elements. Top shield section 36 is formed by enlarging and shaping the peripheral rod top portion 43 of peripheral fuel and moderator rod 41 in the form of a right pentagonal prism and by enlarging and shaping the central rod top portion 42 of central moderator rod 40 in the form of a right regular hexagonal prism such that when fitted together there is no channel for coolant to pass through at the top of the fuel element. The coolant is thus forced to pass out through upper exit holes 32.

The thickness of top shield section 36 may be varied to obtain any desired amount of shielding. Of course, shield section 36 may be composed of any material having satisfactory shielding qualities such as neutron reflectors, moderators, absorbers and structural materials (compounds of boron, steel) or the like. It has been found that for a neutron flux at the core side of the shield portion of about $10^{14}$ neutrons/cm.$^2$/sec., 60 inches of steel will be effective to attenuate the neutron flux to approximately $10^5$ neutrons/cm.$^2$/sec. on the protected side of the shield. Such a neutron density would not be effective to cause activation to any appreciable extent of materials on the protected side of the shield. Each peripheral fuel rod 41 as well as central moderator rod 40 are provided with a grapple rod extension 37 on the top end of which is a grapple knob 38 for the purpose of removing individual components so as to permit refueling of the reactor without having to remove the entire fuel element 30.

FIG. 3 is further illustrative of the configuration of fuel element 30 as a section through fissile fuel section 33. A plurality of coolant flow guides 62 are provided along the inside of shroud 39 to confine the flow of coolant to a longitudinal path along the surface of cladding 44 containing fissile fuel 60 of peripheral fuel rod 41. Central moderator rod 40 is provided with cladding 63 containing moderator material 61.

It should be here noted that cladding material may be selected from any suitable alloy of steel or zirconium which has a low content of neutron absorbing impurities and suitable for use in a reactor, e.g., for a sodium cooled reactor, type 316 stainless steel. Moderator material may be selected from any suitable material such as graphite or BeO having only trace amount of neutron absorbing material.

FIG. 4 is further illustrative of the configuration of fuel element 30 as a section through the top exit cross flow section 35. The variation in diameter of the peripheral fuel rods 41 can be seen where the largest diameter is defined by fissile fuel section 46, the next largest diameter by moderator cross-flow necked-down portion 51 with the smallest diameter formed by top exit necked down portion 50. Two embodiments of peripheral fuel rods 41 are illustrated in FIGS. 5 and 6 respectively. Although not shown, a similar configuration can be utilized for central moderator rod 40.

In FIG. 5, fuel rod 41 is substantially as described supra comprising generally a fissile fuel section 33, a smaller diameter moderator and cross flow section 34, a still more constricted top exit cross flow section 35 and an enlarged top shield section 36. A fuel support pin 70 is provided proximate the lower end of said rod 41 arranged to fit into an appropriate receptacle in the leg of bottom support spider 45 (FIG. 2). The fuel rod 41' of FIG. 6 is identical to fuel rod 41 in FIG. 5 with the exception that a lower cross flow necked down portion 75 is provided immediately above fissile fuel section 33 on the same level as lower exit holes 31 (FIG. 2). The narrower diameter afforded by lower necked down portion 75 permits a lower resistance to flow of coolant out of the middle portion of fuel element 30 during an emergency condition such as sudden boiling of the coolant. It should be further noted that moderator and cross flow section 34 and top exit cross flow section 35 may also comprise materials both reflective and absorbent of neutrons. For example, the rod forming top exit necked down portion 50 may be constructed of a boron steel or like neutron absorbing high strength material and extend to top of fissile fuel section 33 forming the support around which moderator material may be placed to form moderator and cross flow section 34. In the case of fuel rod 41, lower cross flow necked down portion 75 would be the other end of the rod, the top of which would form top exit necked down portion 50.

As described supra, during normal operation, the coolant flows through fissile fuel section 33 where it is raised in temperature through heat transfer from energy released by the fission of fissile fuel 60 (FIG. 3). The higher temperature coolant continues to flow up through moderator and cross flow section 35 where, due to turbulence, variations in hydraulic pressure etc., and since the rods are of smaller diameter, the coolant flow will tend to cross over between the rods to equalize the temperature distribution among various parts of section 34. In addition, there will be a tendency for some of the coolant to pass through lower exit holes 31 into adjacent fuel elements as well as coolant from the adjacent fuel elements to flow in through holes 34 thus intermixing the coolant and reducing temperature gradients within the coolant.

Under an emergency condition such as a sudden increase in reactivity in one fuel element in turn causing a sudden heating or possibly boiling of the coolant, there will be a sudden pressure increase in the offending fuel element forcing some of the coolant back down the fissile fuel section 33, but due to lower pressure above, more coolant will be forced up into cross flow section 34 and due to greater pressure, out of lower exit holes 31 into cross flow sections of adjacent fuel elements. Furthermore, the coolant expelled from the area of high reactivity and having much higher temperature than surrounding coolant will, through both admixture with other coolant and heat transfer to relatively cooler moderator material in cross flow section 34, not cause a great thermal shock to other parts of the reactor. In other words, the thermal shock is absorbed in the moderator and cross flow section 34. It can also be seen that coolant expelled from the region of high reactivity will surge upward through cross flow section 34 to top exit cross flow section 35, where, due to the closure effect of pentagonal shaped peripheral fuel rod top portion 43 and hexagonal shaped central rod top portion 42, the flow of coolant is directed across the top of the core through top exit cross flow section 35. Thus the forces of coolant flow are deflected and absorbed before they reach the reactor vessel head 16. Furthermore, it can be seen that gamma radiation and neutron particles emanating from fissile fuel section 33 are both absorbed and moderated in cross flow section 34 with top shield section 36 absorbing radiation and particles which would stream up through the channels between said rods in moderator and cross flow section 34. For example in the reactor coming within the parameters listed infra, under normal flow conditions with 5 percent of the coolant arranged to flow out of the core through lower exit holes 31, each fuel element at the periphery of the core would require a hole approximately $3/16$ inch in diameter. For 10 percent cross flow between fuel elements, each fuel element would require approximately 3 holes in each shroud of approximately $1/4$ inch diameter. Within the fuel element 30 itself, considering a coolant velocity of 8.6 ft./sec. average, intermixing will be achieved in the necked down region above fissile section 33 where under the worst condition, in a 10 inch length, $1/8$ of the volume of coolant around center rod 40 will move completely over to an adjacent fuel rod 41 region. For the peripheral fuel rods 41, approximately $1/2$ the volume of coolant around the rod will move over to the adjacent fuel rod regions for a 10 inch length along the rods. The above results with a pressure drop across fuel elements of approximately 0.8 p.s.i. When an emergency condition exists within a fuel element, such as sudden expansion of the coolant, the pressure drop will be appreciably greater, thus affording a higher flow rate out through lower exit holes 31 and between fuel elements 30. Relating the above intermixing to temperature in the case of overheating, say in the central rod region, in a 10 inch length, assuming an equal volume of coolant around each rod, $1/8$ of the volume at the higher temperature, for example 920° F. (100° F. above outlet temperature) would intermix with 820° F. coolant from other rods. In the 10 inch length the intermixing would result in the temperature of the coolant at the periphery rising to 833° F. It can be seen that when $1/8$ of the coolant at the center flows to an adjacent peripheral rod, six peripheral fuel rods would contribute $1/8$ of their coolant to the center rod. In this case the temperature at the center rod would be reduced to 845° F. in the 10 inch length. In the case of overheating of a peripheral fuel rod, taking $1/4$ of the volume at the higher temperature and intermixing with one adjacent fuel rod and $1/4$ of the volume at the higher temperature mixing with the other fuel rod with $1/8$ of the coolant volume mixing with the center rod, then taking a high temperature of 920° F., the temperature of the coolant around the rod having the hot spot would be approximately 857° F. (estimating $5/8$ of the coolant at 820° F. mixed with $3/8$ of the coolant at 920° F. remaining around the rod having the hot spot), which the coolant around each adjacent fuel rod would be approximately 845° F. and around the center rod would be approximately 834° F.

The above examples are based on the absence of turbulence promoters or other devices placed in the channel specifically for the purpose of agitating the coolant. The above examples thus illustrate the use of this invention to achieve improved nuclear reactor operation by not impeding the flow of coolant through the reactor core in addition to achieving cross flows.

The following data is illustrative of a typical sodium cooled reactor using the core and fuel elements of this invention:

Reactor type: fast neutron, heterogeneous (Sefor)
Fuel:
    Mixed $PuO_2$–$UO_2$ pelletized
    Total enrichment=0.168 atomic percent
Moderating materials (volume fraction):
    BeO=10.02%
    St. steel=23.77%
    Sodium=20.88%

Mean neutron energy: 120 kev. (max. energy~2.5 mev.)
Power output: 20 mwt.
Reflector control:
  Nickel rods
    Total number=10
Heat transfer systems:
  Primary, sodium
  Secondary, sodium
  Tertiary, air
Containment:
  Main vessel (type 304 SS)
  I.D. at fissile fuel section=40 in.
  I.D. at upper section=57 in.
  Wall thickness=0.375–0.750 in.
  Design pressure=50 p.s.i.g.
Fuel design core:
  Diameter=33.8 in.
  Fissile fuel length=33.8 in.
Fuel rod:
  Overall length=120 in.
  O.D. at fissile fuel section=1.0 in.
  O.D. at moderator and cross flow section=0.88 in.
  Total No. in core=618
  Cladding=type 316 stainless steel
Moderator rod: Total No. in core=108
Shroud:
  Diameter across flats=3.066 in.
  Length=approx. 106 in.
  Wall thickness=0.060 in.
  Material=type 316 stainless steel
Coolant:
  Inlet temperature=700° F.
  Outlet temperature=820° F.
  Flow rate at power=4360 g.p.m.
  Velocity in core=8.6 ft./sec. average, 13.0 ft./sec. max.
  Heat transfer coefficient=20,000 B.t.u./hr.-ft.$^2$/° F.
Fuel loading:
  U–238=1598 kg.
  Pu–240=26 kg.
  Pu–239=296 kg.
  Total=1920 kg.

Although the foregoing embodiment has been described in detail, there are obviously many other embodiments and variations in configuration which can be made by a person skilled in the art without departing from the spirit and scope or principle of this invention. Therefore, this invention is not to be limited except in accordance with the scope of the appended claims.

What is claimed is:

1. In a nuclear reactor utilizing fluid coolant means, a reactor core comprising a plurality of fuel elements each comprising means defining a shroud having inlet and outlet means and port means providing cross flow zones for circulation of said coolant, a central moderator rod having a bottom portion and a top portion within said shroud, a plurality of fuel rods in spaced parallel relation defining a lower fissile fuel section, a moderator section immediately above said lower fissile fuel section in one of said shroud cross flow zones, an exit cross flow section of said rod disposed in a second of said cross flow zone, a top shield section immediately above said top exit cross flow section, said top shield section defined by top portions of said fuel rod and said moderator rod, and support means for said fuel rods and said moderator rod proximate the lower end of said shroud.

2. The apparatus as defined in claim 1 wherein said support means proximate the lower end of said shroud comprises a bottom support spider means, receptacle means in said bottom support spider for receiving said bottom portion of said fuel rod and said bottom portion of said center rod and maintaining said fuel rods and said center rod in fixed relation within said shroud.

3. The apparatus as defined in claim 1 wherein said top shield portion comprises said top portions of said fuel rods and said top portion of said center moderator rod defining right polygonal prisms arranged in contiguous array to form a top shield.

4. In a nuclear reactor utilizing fluid coolant means, a reactor core comprising a plurality of fuel elements each comprising means defining a shroud having inlet and outlet means and port means providing cross flow zones for circulation of said coolant, a center moderator rod having a bottom portion and a top portion within said shroud, a plurality of fuel rods in spaced parallel relation defining a lower fissile fuel section, a moderator section immediately above said lower fissile fuel section in one of said shroud cross flow zones and having a diameter smaller than the diameter of said fissile fuel section, an exit cross flow section of said rod disposed in a second of said cross flow zones and having a diameter smaller than the diameter of said moderator section, a top shield section immediately above said moderator section defined by top portions of said fuel rods and said moderator rod, and support means for said fuel rods and said moderator rod proximate the lower end of said shroud.

5. In a nuclear reactor utilizing fluid coolant means, a reactor core comprising a plurality of fuel elements each comprising means defining a shroud having coolant inlet means proximate the lower end thereof, a coolant outlet means proximate the upper end thereof and port means proximate the middle portion thereof providing cross flow zones for circulation of said coolant, a center moderator rod having a bottom portion and a top portion within said shroud, a plurality of fuel rods in spaced parallel relation for the upward flow of fluid coolant defining a lower fissile fuel section, a moderator section immediately above said lower fissile fuel section in one of said shroud cross flow zones and having a diameter smaller than the diameter of said fissile fuel section, a top shield section immediately above said moderator section defined by top portions of said fuel rods and said moderator rod, and support means for said fuel rods and said moderator rod proximate the lower end of said shroud.

6. The apparatus as defined in claim 5 wherein the top portions of said fuel rods define right pentagonal prisms and the top portion of said center moderator rod defines a right hexagonal prism, said prisms arranged in contiguous array to form said top shield section.

7. In a nuclear reactor, a reactor core comprising a liquid coolant means, a plurality of fuel elements each comprising means defining a shroud having inlet and outlet means for said coolant, a center moderator rod having a bottom portion and a top portion, a plurality of fuel rods arranged for the upward flow of coolant therebetween within said shroud, each of said fuel rods comprising a top portion and a bottom portion, a bottom support means proximate the lower end of said shroud, a fissile fuel section immediately above said bottom portion, a moderator and cross flow section immediately above said fissile fuel section and having a diameter smaller than the diameter of said fissile fuel section, a top exit cross flow section immediately above said moderator and cross flow section and having a diameter smaller than the diameter of said moderator and cross flow section, a top shield section immediately above said top exit cross flow section, said top shield section defined by said fuel rod top portion and said center moderator rod top portion, and a grappling means proximate the top shield section of said fuel element combined to define said nuclear reactor core.

8. The apparatus as defined in claim 7 wherein said moderator section is further defined as having a diameter proximate the lower portion thereof less than the diameter proximate the upper portion thereof.

9. In a nuclear reactor, a reactor core comprising a liquid coolant means, a plurality of of fuel elements each comprising means defining a shroud having coolant inlet means proximate the lower end of said shroud, coolant outlet means proximate the upper end of said shroud, a center moderator rod having a bottom portion and a top portion, a plurality of fuel rods arranged for upward flow of coolant therebetween within said shroud, each of said fuel rods comprising a top portion and a bottom portion, a bottom support means proximate the lower end of said shroud, a fissile fuel section immediately above said bottom portion, a moderator and cross flow section immediately above said fissile fuel section and having a diameter smaller than the diameter of said fissile fuel section, a top exit cross flow section immediately above said moderator and cross flow section, inlet and outlet means in said shroud proximate and adjacent the lower portion of said moderator and cross flow section, a top shield section immediately above said top exit cross flow section, said top shield section defined by said fuel rod top portion and said moderator rod top portion, and a grappling means proximate said top shield section of said fuel element combined to define said nuclear reactor core.

10. In a nuclear reactor, the process comprising the steps of flowing liquid coolant material through a fissile fuel section comprising closely spaced fissile fuel containing rods wherein said liquid coolant material is raised to a higher temperature, then flowing said higher temperature liquid coolant material through a moderator and cross flow section comprising moderator material containing rods aligned and equal in number to said fissile fuel containing rods and having a diameter less than the diameter of said fissile fuel containing rods wherein said higher temperature liquid coolant material is intermixed and equalized in temperature, then flowing said intermixed liquid coolant material through a top exit cross flow section comprising rods aligned and equal in number to said fissile fuel containing rods and having a diameter less than the diameter of said moderator containing rods and having a solid top portion wherein the flow of the said coolant material is at right angles to the flow of said coolant material in said moderator and cross flow section to further intermix said coolant and equalize pressures within said coolant material.

11. The process as defined in claim 10 wherein said liquid coolant material is sodium.

No references cited.

CARL D. QUARFORTH, *Primary Examiner*.